United States Patent
Asai et al.

(10) Patent No.: US 7,266,232 B2
(45) Date of Patent: Sep. 4, 2007

(54) APPARATUS AND METHOD FOR INSPECTING PATTERN

(75) Inventors: Hiroshi Asai, Kyoto (JP); Yuichiro Hikida, Kyoto (JP); Hiroyuki Onishi, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 693 days.

(21) Appl. No.: 10/434,105

(22) Filed: May 9, 2003

(65) Prior Publication Data

US 2003/0228045 A1 Dec. 11, 2003

(30) Foreign Application Priority Data

Jun. 10, 2002 (JP) ............................. P2002-168054

(51) Int. Cl.
*G06K 9/00* (2006.01)
(52) U.S. Cl. ...................... 382/141; 382/147; 382/168; 348/128; 356/237.2
(58) Field of Classification Search ................ 382/141, 382/149, 172, 173, 144, 145, 257, 143, 170, 382/171, 274, 147, 168; 250/559.22; 378/98.7, 378/87; 348/128, 125, 126, 92, 127, 129; 356/124, 237.2, 239.4; 358/448
See application file for complete search history.

(56) References Cited

U.S. PATENT DOCUMENTS

| | | | | |
|---|---|---|---|---|
| 4,574,393 A | * | 3/1986 | Blackwell et al. | .......... 382/162 |
| 5,355,212 A | * | 10/1994 | Wells et al. | ............. 356/237.4 |
| 5,638,465 A | * | 6/1997 | Sano et al. | .................. 382/281 |
| 5,949,905 A | * | 9/1999 | Nichani et al. | ............. 382/173 |
| 5,963,661 A | | 10/1999 | Kato et al. | |
| 6,621,571 B1 | * | 9/2003 | Maeda et al. | ............ 356/237.5 |

(Continued)

FOREIGN PATENT DOCUMENTS

JP 4-78854 3/1992

(Continued)

OTHER PUBLICATIONS

Japanese Office Action issued in corresponding Japanese Patent Application No. JP 2002-168054, dated Feb. 21, 2007.

*Primary Examiner*—Sheela Chawan
(74) *Attorney, Agent, or Firm*—McDermott Will & Emery LLP

(57) ABSTRACT

An inspection apparatus (1) has an image pickup part (2) for performing an image pickup of a substrate (9), an operation part (4) to which an image signal is inputted from said image pickup part (2) and a computer (5), and the operation part (4) specifies an inspection image and a reference image from an object image acquired by the image pickup part (2). In the operation part (4), a region class to which each pixel of the specified inspection image belongs is specified on the basis of a corresponding pixel value of the reference image. In a comparator circuit of the operation part (4), a differential absolute value between each pixel of the inspection image and a corresponding pixel of the reference image is calculated and the differential absolute value is compared with a defect check threshold value in accordance with the specified region class, to perform defect check. The inspection apparatus (1) can thereby appropriately detect a defect in accordance with the region class to which each pixel belongs.

15 Claims, 13 Drawing Sheets

U.S. PATENT DOCUMENTS 6,674,890 B2 *   1/2004   Maeda et al. ............... 382/149
6,697,517 B1 *   2/2004   Hunter ....................... 382/149

FOREIGN PATENT DOCUMENTS

| JP | 4-310852 | 11/1992 |
| JP | 4-316346 | 11/1992 |
| JP | 10-171996 | 6/1998 |
| JP | 2000-113189 | 4/2000 |
| JP | 2000-283929 | 10/2000 |
| JP | P2002-22421 A | 1/2002 |

* cited by examiner

Background Art

APPARATUS AND METHOD FOR INSPECTING PATTERN

BACKGROUND OF THE INVENTION

1. Field of the Invention

The present invention relates to a technique for inspecting pattern on an object.

2. Description of the Background Art

In the field of inspection of pattern formed on a semiconductor substrate, a color filter, a shadow mask, a printed circuit board or the like, conventionally, a comparison check method has been mainly performed with gray-scale images. For example, a differential image which indicates absolute values of the difference between an inspection image (an image to be inspected) and a reference image is obtained and a region in the differential image which has pixel values larger than a predetermined threshold value is detected as a defect. In a case of inspection of pattern having periodicity, a plurality of inspection images are sequentially acquired and a comparison check is performed by using an inspection image other than the image under inspection as a reference image.

Such a comparison check has a problem that a threshold value to be determined is changed by variation in graininess of an image due to variation in sharpness. FIGS. 1A and 1B are graphs each showing a histogram of an absolute value of difference (hereinafter, referred to as "differential absolute value") between pixels of the inspection image and corresponding pixels of the reference image (in other words, a histogram of differential image). FIG. 1A shows a histogram 91a in a case where the graininess of image is large and FIG. 1B shows a histogram 91b in a case where the graininess of image is small. FIGS. 1A and 1B show the histograms of the differential images which are obtained on the same pattern, but the distributions of differential absolute values in the histograms are different due to the difference in graininess of pickup images.

Therefore, for example, when a threshold value T1b is determined in accordance with the histogram 91b of FIG. 1B, if the graininess of the inspection image temporarily becomes large and the distribution of the differential absolute values comes into a state of FIG. 1A, a normal pixel (a pixel corresponding to a normal region) whose differential absolute value is larger than the threshold value T1b and smaller than the threshold value T1a is detected as a false defect. On the other hand, when the threshold value T1a is determined in accordance with the histogram 91a of FIG. 1A, if the graininess of the inspection image temporarily becomes small and the distribution of the differential absolute values comes into a state of FIG. 1B, a defective pixel (a pixel corresponding to a defective region) whose differential absolute value is larger than the threshold value T1b and smaller than the threshold value T1a is not detected.

Then, Japanese Patent Application Laid-Open Gazette No. 2002-22421 proposes a method for removing an effect of variation in sharpness of image (in other words, variation in graininess) by calculating a standard deviation of pixel values of the differential image and normalizing the histogram of the differential image on the basis of the standard deviation.

In a case of inspection of pattern in which an aluminum wiring whose surface has coarse grain is formed in a relatively flat region (hereinafter, referred to as "background region") on a semiconductor substrate, if a histogram 92 of a differential image on a differential absolute value as shown in FIG. 2A is obtained, an appropriate defect detection can not always be performed even if a threshold value T2a is determined on the basis of the histogram 92.

The reason is that the histogram 92 of FIG. 2A is obtained by synthesizing a histogram 921 of a differential image on an interconnection region and a histogram 922 of a differential image on a background region as shown in FIG. 2B and the differential absolute value of a defective portion 922a in the histogram 922 on the background region becomes smaller than the threshold value T2a due to an effect of the histogram 921 on the interconnection region. As a result, even if the method disclosed in the Japanese Patent Application Laid-Open Gazette No. 2002-22421 is used, it is impossible to determine an appropriate threshold value in a case of the histogram 92 of FIG. 2A.

SUMMARY OF THE INVENTION

An objective of the present invention is to detect defects appropriately from pattern on an object.

The present invention is intended for an apparatus for inspecting pattern on an object.

According to the present invention, the apparatus comprises an image pickup device for performing an image pickup of an object to acquire data of gray-scale inspection image, a memory for storing data of reference image, a region class specifying circuit for specifying a region class to which each pixel of the inspection image belongs on the basis of a pixel value of the reference image, and a check circuit for checking each pixel of the inspection image by using a parameter value in accordance with a corresponding region class.

The apparatus of the present invention can perform an appropriate defect check in accordance with the region class by specifying the region class on the basis of the reference image.

According to one preferred embodiment of the present invention, pattern on the object have periodicity and the inspection image is part of an object image acquired by the image pickup device, and the memory stores a region away from the inspection image by an integral multiple of a cycle of the pattern as the reference image.

According to another preferred embodiment of the present invention, the apparatus further comprises a mechanism for transferring the object relatively to the image pickup device, and in the apparatus, pattern on the object have periodicity, and the inspection image and the reference image are images of regions which are away from each other by an integral multiple of a cycle of the pattern.

According to still another preferred embodiment of the present invention, the memory stores a golden template image as the reference image.

According to an aspect of the present invention, the region class specifying circuit generates a histogram of pixel values of the reference image and specifies the region class on the basis of the histogram. Thus, by using the histogram, it is possible to specify the region class with high precision.

According to another aspect of the present invention, the parameter value is a value corresponding to at least one of a differential image between the inspection image and the reference image, a normalized image which is obtained by normalizing pixel values of the differential image with a differential statistics feature value and an image which is obtained by smoothing the normalized image.

According to still another aspect of the present invention, the memory stores a plurality of images, and the apparatus further comprises a circuit for generating the reference image from the plurality of images. The apparatus of the present invention can thereby obtain a preferable reference image even if one image has a defect.

The present invention is also intended for a method of inspecting pattern on an object and a computer-readable recording medium carrying a program for causing a computer to perform the inspection.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
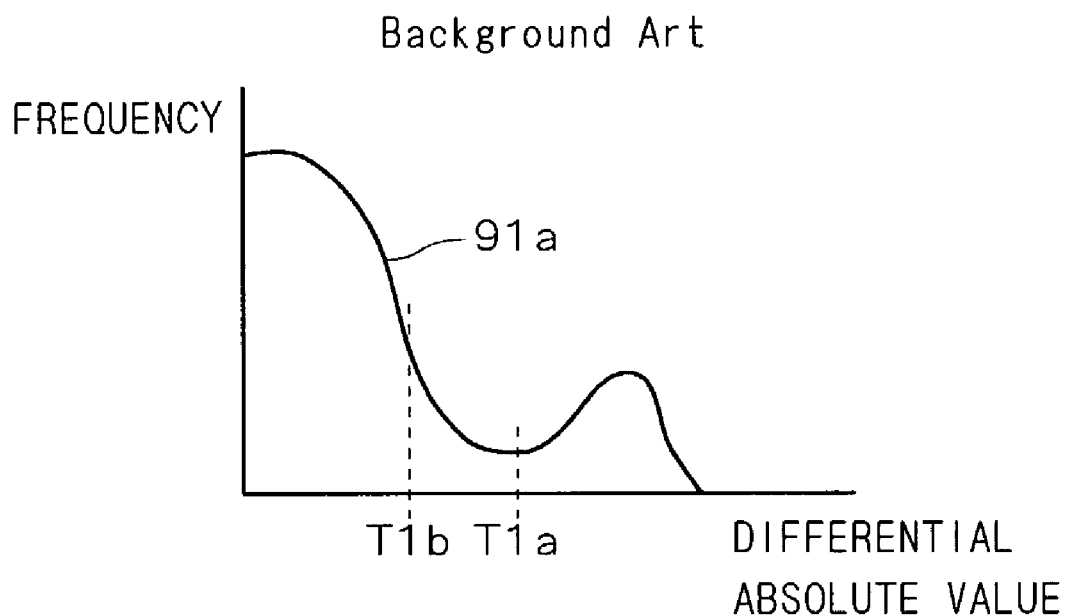
FIGS. 1A, 1B, 2A and 2B are graphs each showing a histogram of a differential image.
Figure 1B:
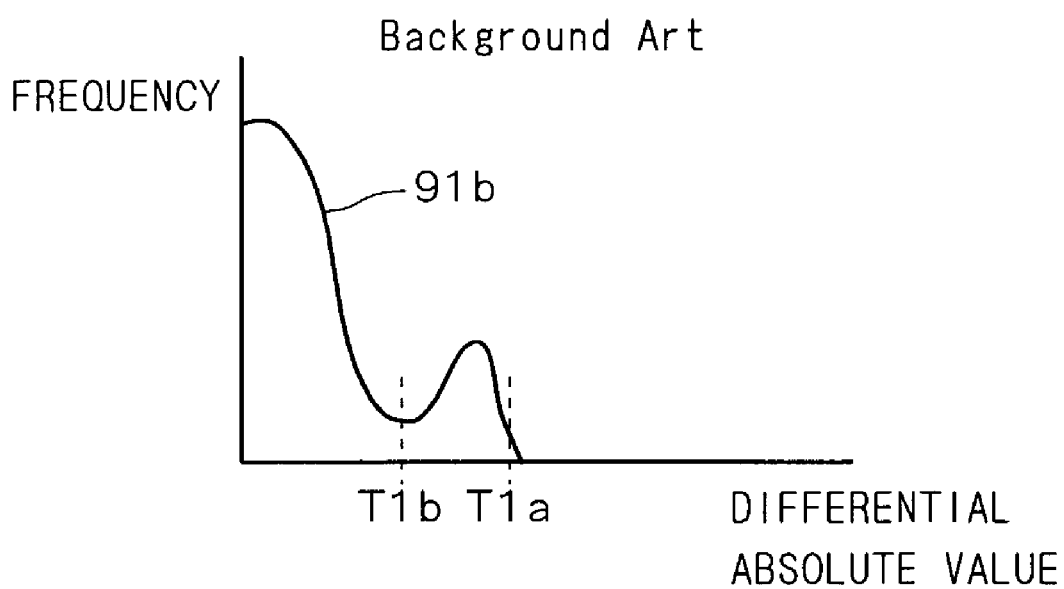
Figure 2A:
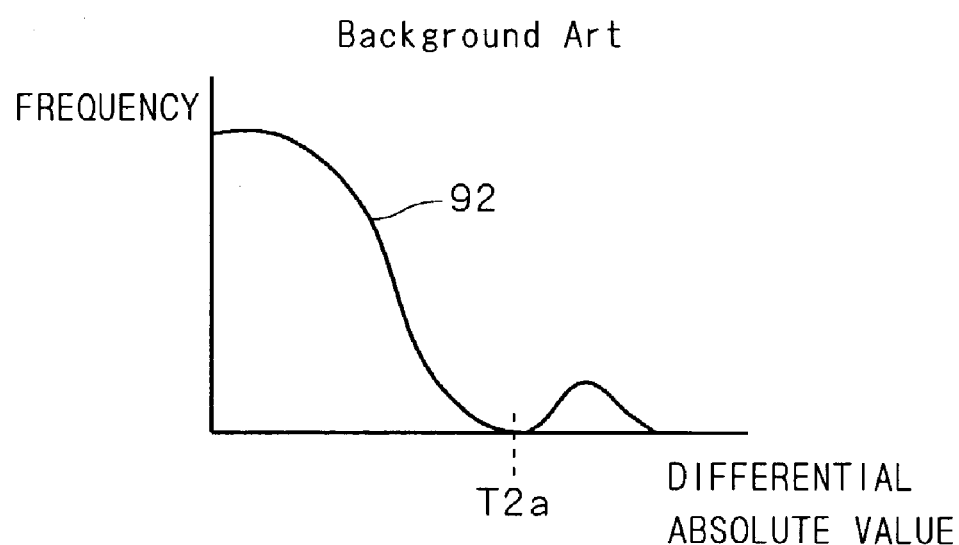
Figure 2B:
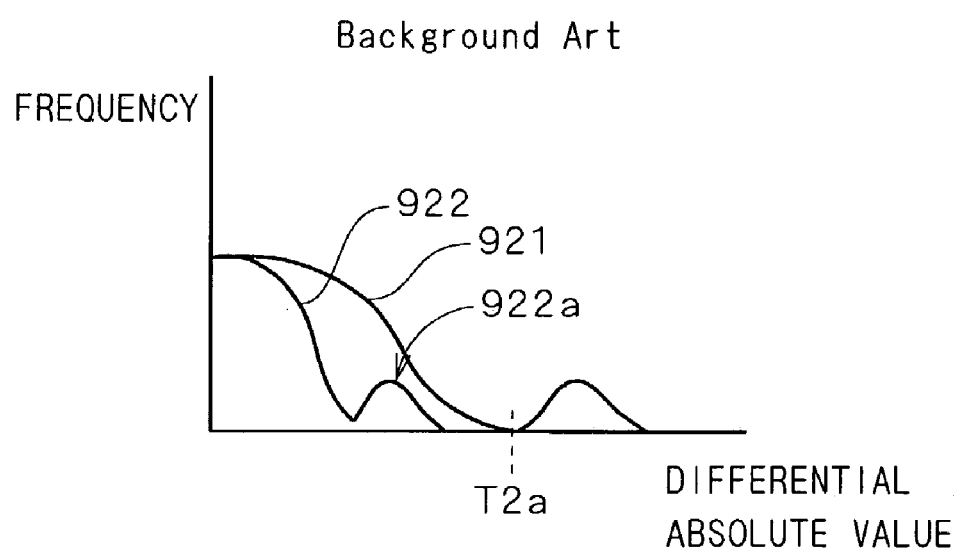
Figure 3:
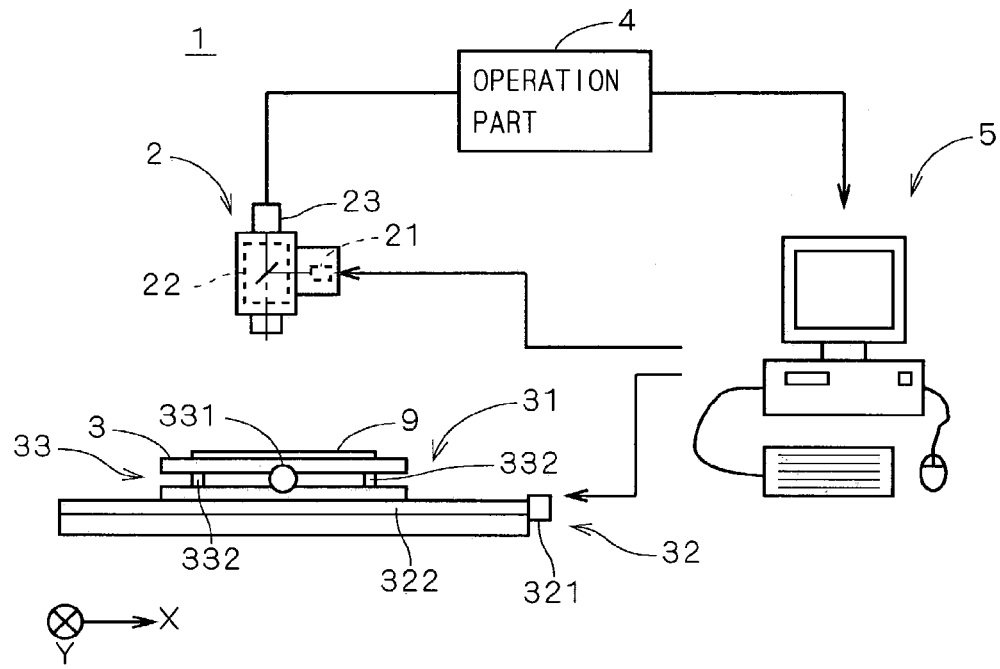
FIG. 3 is a view showing a construction of an inspection apparatus.

FIG. 3 is a view showing a construction of an inspection apparatus 1 in accordance with the first preferred embodiment of the present invention. The inspection apparatus 1 has an image pickup part 2 for performing an image pickup of a predetermined region on a semiconductor substrate (hereinafter, referred to as "substrate") 9 to acquire data of a gray-scale object image, a stage 3 for holding the substrate 9 and a stage driving part 31 for transferring the stage 3 relatively to the image pickup part 2.

The image pickup part 2 has a lighting part 21 for emitting an illumination light, an optical system 22 for guiding the illumination light to the substrate 9 and receiving the light from the substrate 9 and an image pickup device 23 for converting an image of the substrate 9 formed by the optical system 22 into an electrical signal. The stage driving part 31 has an X-direction transfer mechanism 32 for transferring the stage 3 in the X direction of FIG. 3 and a Y-direction transfer mechanism 33 for transferring the stage 3 in the Y direction. The X-direction transfer mechanism 32 has a construction in which a ball screw (not shown) is connected to a motor 321 and moves the Y-direction transfer mechanism 33 in the X direction along a guide rail 322 with rotation of the motor 321. The Y-direction transfer mechanism 33 has the same construction as the X-direction transfer mechanism 32 and transfers the stage 3 in the Y direction along the guide rail 332 by its ball screw (not shown) with rotation of its motor 331.

The inspection apparatus 1 further has an operation part 4 which receives the electrical signal indicating an object image from the image pickup part 2 and a computer 5 connected to the image pickup part 2, the stage driving part 31 and the operation part 4, and the computer 5 serves as a control part for controlling the constituent elements of the inspection apparatus 1. In the inspection apparatus 1, the computer 5 controls the stage driving part 31 to relatively transfer an image pickup position of the image pickup part 2 to a predetermined position on the substrate 9.

Figure 4:
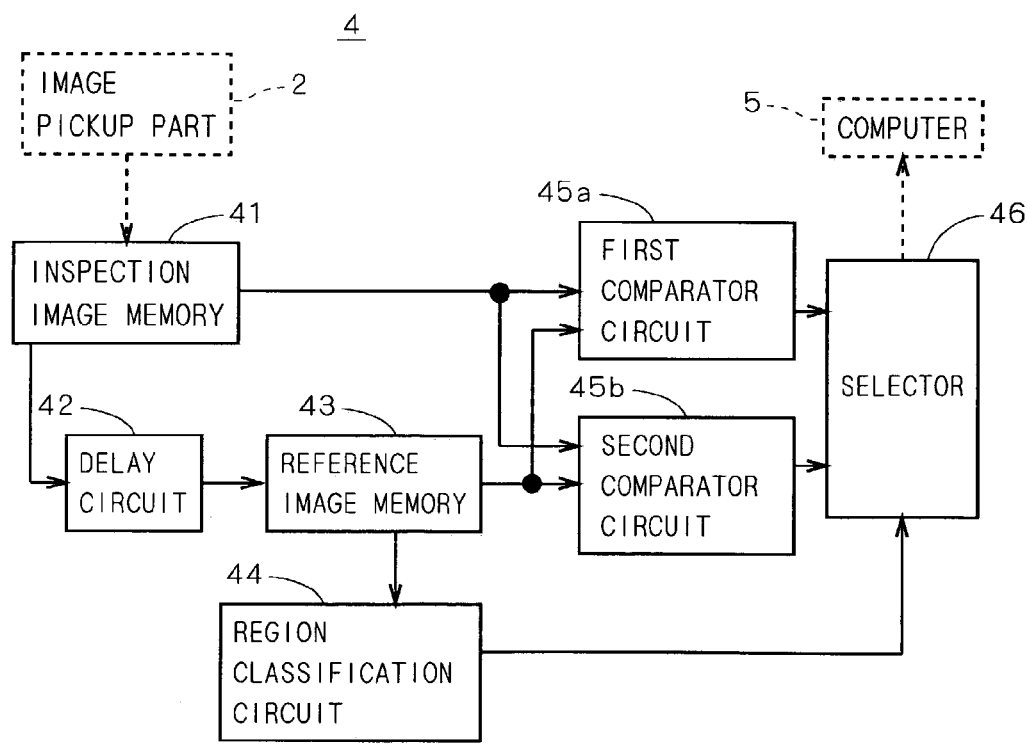
FIG. 4 is a block diagram showing a constitution of an operation part in accordance with a first preferred embodiment.

FIG. 4 is a block diagram showing a constitution of the operation part 4. Discussion will be made below on functions of the constituent elements in the operation part 4 and an operation of the inspection apparatus 1 for checking defect on an inspection image (an image to be inspected).

The operation part 4 receives the signal from the image pickup part 2 and stores data of the object image into an inspection image memory 41. In the inspection image memory 41, each of a plurality of regions in the object image is specified as an available inspection image. The inspection image memory 41 sequentially outputs a pixel value of an inspection image to a first comparator circuit 45a, a second comparator circuit 45b and a delay circuit 42. The delay circuit 42 delays the inputted pixel value as appropriate and outputs the pixel value to a reference image memory 43 and data for one inspection image is stored in the reference image memory 43. The reference image memory 43 sequentially outputs the stored pixel value of the inspection image to the first comparator circuit 45a and the second comparator circuit 45b. With this operation, the pixel value from the inspection image memory 41 and the pixel value delayed by one inspection image are inputted to the first comparator circuit 45a and the second comparator circuit 45b at the same time.

Figure 5A:
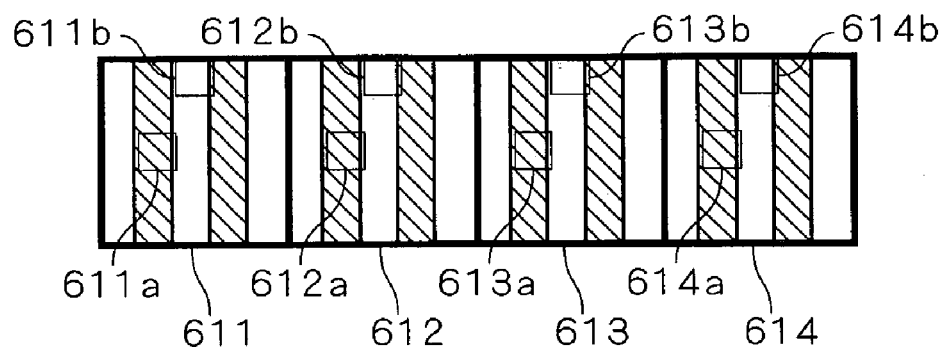
FIGS. 5A to 5C are views showing inspection images, reference images and region classes of the reference images, respectively.

FIG. 5A is a view showing a state where a plurality of inspection images 611 to 614 (hereinafter generally referred to as "inspection images 610") are stored in the inspection image memory 41 as (part of) an object image. The object image is an image of a memory region in a die (a region corresponding to one chip) on the substrate 9 having a memory region and a logic region, in which patterns are periodically arranged. Every cycle of the patterns, part of the object image is used as an inspection image. In other words, a region away from one inspection image 610 by an integral multiple of the cycle of the patterns is specified as another inspection image 610.

Herein, assuming that the inspection image memory 41 sequentially outputs the pixel values of the inspection images 610 from the rightmost inspection image 614, when the pixel value of one inspection image 610 is outputted, the corresponding pixel value of the adjacent inspection image 610 on the right side is outputted from the reference image memory 43. Specifically, when one pixel value of the inspection image 613 is outputted from the inspection image memory 41, the corresponding pixel value of the inspection image 614 is outputted from the reference image memory 43. Similarly, when one pixel value of the inspection image 612 or 611 is outputted from the inspection image memory 41, the corresponding pixel value of the inspection image 613 or 612 is outputted from the reference image memory 43, respectively. When the pixel value of the first inspection image 614 is outputted from the inspection image memory 41, data of the adjacent inspection image 613 is stored into the reference image memory 43 in advance (for example, data of the inspection image 613 is outputted from the inspection image memory 41 as dummy data), and the corresponding pixel values of the inspection images 614 and 613 are outputted from the inspection image memory 41 and the reference image memory 43, respectively, at the same time.

Thus, when a pixel value of each inspection image 610 is outputted from the inspection image memory 41, data of the adjacent inspection image 610 is stored in the reference image memory 43 as data of the reference image (exactly, when one pixel value is outputted from the reference image memory 43, the corresponding pixel value of the adjacent inspection image 610 is inputted from the delay circuit 42 for substitution), and the pixel value of the reference image is outputted from the reference image memory 43.

Figure 5B:
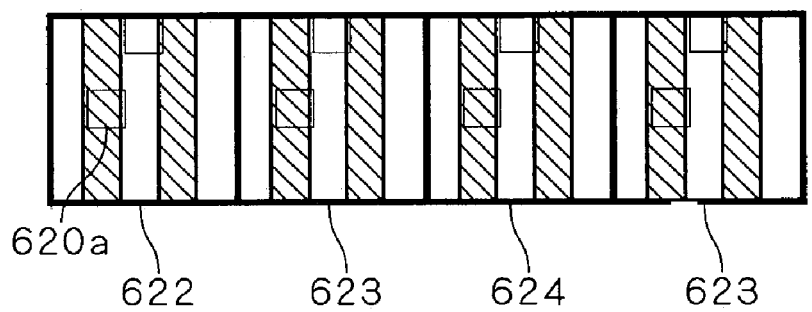

FIG. 5B is a view showing reference images, correspondingly to FIG. 5A. In FIG. 5B, the reference images 622, 623 and 624 are the inspection images 612, 613 and 614, respectively, and the reference images 623, 624, 623 and 622 are used correspondingly to the inspection images 614, 613, 612 and 611 arranged from the right side in FIG. 5A. In the following discussion, these reference images are generally referred to as the reference images 620.

As shown in FIG. 4, the reference image memory 43 is connected to a region classification circuit 44, and at the point in time when data of one reference image 620 is accumulated in the reference image memory 43 (in other words, immediately before the first pixel value of one inspection image 610 is outputted from the inspection image memory 41), the region classification circuit 44 calculates an average of the pixel values of the reference image 620 stored in the reference image memory 43. Therefore, at the point in time when the corresponding pixel values of the inspection image 610 and the reference image 620 are outputted from the inspection image memory 41 and the reference image memory 43, respectively, the average value is already prepared in the region classification circuit 44.

Figure 5C:
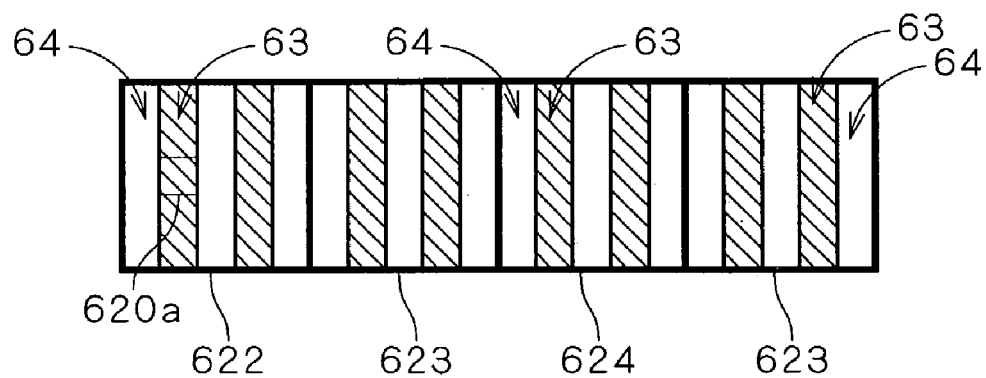

The average value is prepared as a threshold value (hereinafter, referred to as a "region classification threshold value") for specifying a region class (a type of region) to which each pixel belongs. FIG. 5C is a view showing the reference images 620 in a case where a region class to which each pixel belongs is specified with the region classification threshold value. In FIG. 5C, a hatched region 63 indicates a dark region and a non-hatched region 64 indicates a bright region. These regions 63 and 64 are each a region determined by pixel, and do not completely coincide with actual dark and bright regions (corresponding pixels 620a are shown in the leftmost reference images 622 in FIGS. 5B and 5C).

When the region classification threshold value can be obtained with high precision (particularly, in a later-discussed case where the region classification threshold value is obtained by a computer), it is preferable that the region classification threshold value should be obtained on the basis of the position of the minimum value in a histogram of pixel values of a reference image and the like).

Figure 6:
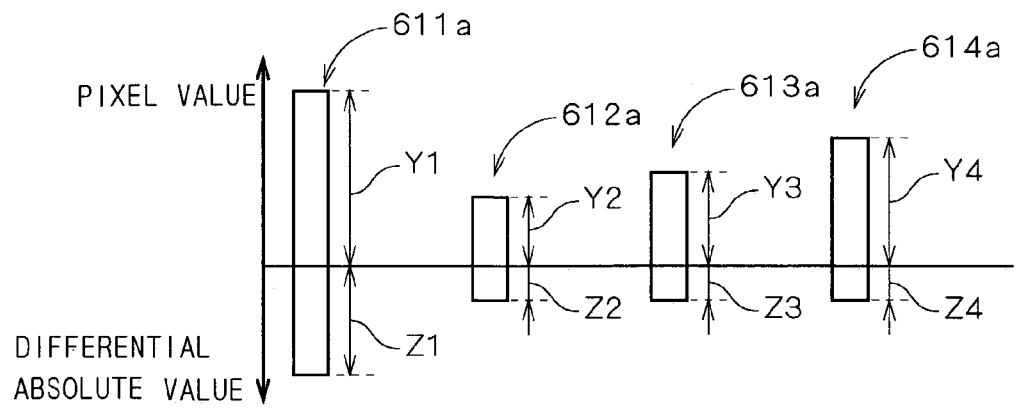
FIG. 6 is a view used for explaining calculation of a differential absolute value.

Both the first and second comparator circuits 45a and 45b calculate the differential absolute value between the pixel value of the inspection image 610 inputted from the inspection image memory 41 and that of the reference image 620 inputted from the reference image memory 43. FIG. 6 is a view used for explaining the calculation of differential absolute value on one pixel of each inspection image 610 shown in FIG. 5A. Pixel values with signs 611a, 612a, 613a and 614a in FIG. 6 indicate values of the pixels 611a, 612a, 613a and 614a in FIG. 5A.

When the value of the pixel 614a is outputted from the inspection image memory 41, the value of the pixel 613a is outputted from the reference image memory 43 and then a differential absolute value Z4 is calculated from the pixel value Y4 of the pixel 614a and the pixel value Y3 of the pixel 613a. When the values of the pixels 613a, 612a and 611a are outputted from the inspection image memory 41, the values of the pixels 614a, 613a and 612a are outputted from the reference image memory 43 and a differential absolute value Z3 (=Z4) between the pixel value Y4 and the pixel value Y3, a differential absolute value Z2 between the pixel value Y3 and the pixel value Y2 and a differential absolute value Z1 between the pixel value Y2 and the pixel value Y1 are calculated.

When the differential absolute value of one pixel in the inspection image 610 is calculated in each of the comparator circuits 45a and 45b, defect check is subsequently performed. The first comparator circuit 45a and the second comparator circuit 45b are provided correspondingly to the dark region 63 and the bright region 64, respectively, and each determines a threshold value (hereinafter, referred to as a "defect check threshold value") on a differential absolute value for checking whether there is a defect or not in accordance with each region class in advance. In other words, different check judgment threshold values are determined in the first and second comparator circuits 45a and 45b and each of the comparator circuits 45a and 45b decides that the pixel is a defective one when the calculated differential absolute value is larger than the defect check threshold value and the pixel is a non-defective one (i.e., a normal one) when the differential absolute value is smaller than the defect check threshold value.

For example, in checking the pixel 611a shown in FIG. 6, assuming that the defect check threshold value of the first comparator circuit 45a is T1 (T1<Z1) and that of the second comparator circuit 45b is T2 (T2>Z1), the pixel 611a is decided to be "defective" in the first comparator circuit 45a and decided to be "non-defective" in the second comparator circuit 45b. Both defect check results are outputted from the comparator circuits 45a and 45b to a selector 46.

On the other hand, the pixel value outputted from the reference image memory 43 is inputted to the region classification circuit 44, and the region classification circuit 44 specifies whether the pixel to be checked belongs to the dark region 63 or the bright region 64 in the reference image 620 on the basis of the region classification threshold value (see FIG. 5C). Specifically, it is decided that the pixel belongs to the dark region 63 when the value of the pixel in the reference image 620 is smaller than the region classification threshold value and the pixel belongs to the bright region 64 when the value of the pixel in the reference image 620 is equal to or larger than the region classification threshold value. Data indicating the region class is inputted to the selector 46.

The selector 46, receiving the data indicating the region class (region classification result) from the region classification circuit 44 and the defect check results from the comparator circuits 45a and 45b, selects one of the defect check results from the first and second comparator circuits 45a and 45b on the basis of the region classification result and transmits the selected defect check result to the computer 5. In the case of the pixel 611a of FIG. 5A, since the pixel 611a belongs to the dark region 63 (see FIG. 5C), the selector 46 selects the defect check result from the first comparator circuit 45a (i.e. "defective") and outputs the selected defect check result to the computer 5.

Thus, the inspection apparatus 1 performs defect check on each pixel in the inspection image 610 with the defect check threshold value for each region class.

Table 1 partially shows results obtained by the above defect checks on the inspection images 610 of FIG. 5A. In Table 1, the reference signs of the pixels in FIG. 5A are put in the rows of "Inspection Image Pixel No." and "Reference Image Pixel No.". The pixels 611a to 614a correspond to one another in inspection images 610 and the pixels 611b to 614b correspond to one another in inspection images 610, and the pixels 611a and 611b are defective pixels. In the row of "Comparator Circuit", there is "1" when the defect check result of the first comparator circuit 45a is selected and "2" when the defect check result of the second comparator circuit 45b is selected.

Figure 7:
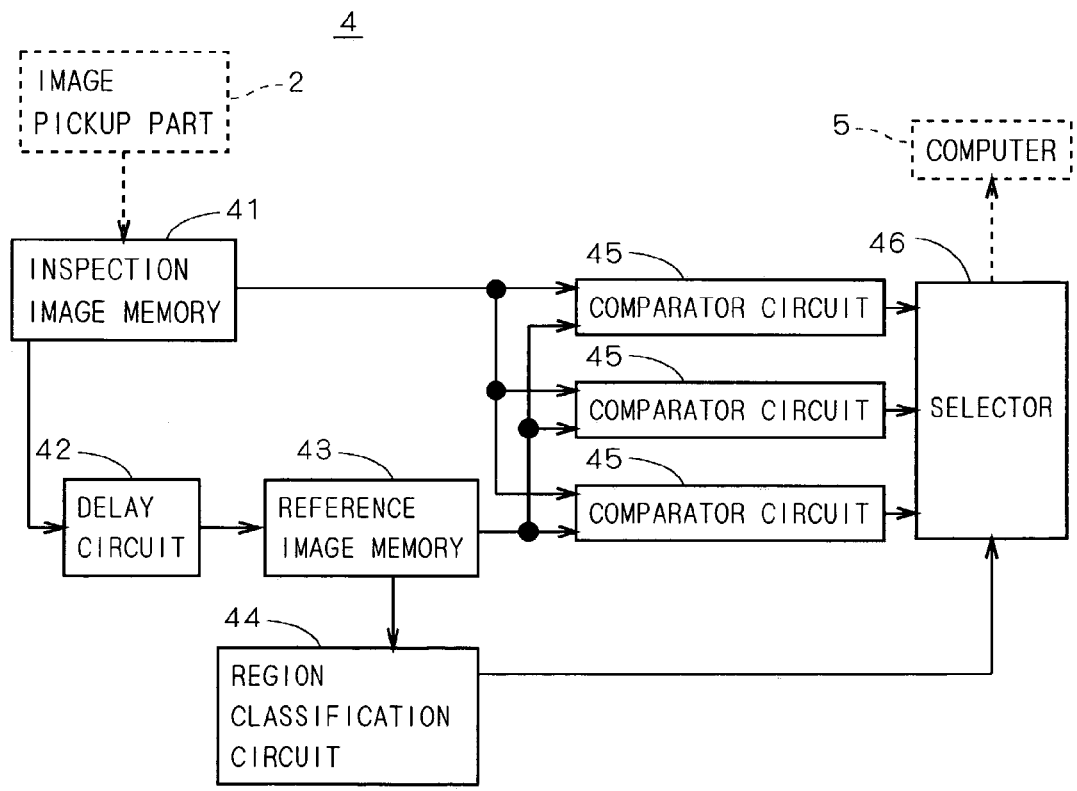
FIG. 7 is a block diagram showing a constitution of an operation part in a case where there are three region classes.

When there are three classes of regions in the inspection image, as shown in FIG. 7, three comparator circuits 45 are provided to determine threshold values in accordance with the three region classes, respectively, and the selector 46 selects one of outputs from the three comparator circuits 45 on the basis of the region classification result from the region classification circuit 44, to perform an appropriate defect inspection. In other words, by providing comparator circuits 45 as many as region classes, it is possible to perform a defect inspection even if there are three or more region classes.

Figure 8:
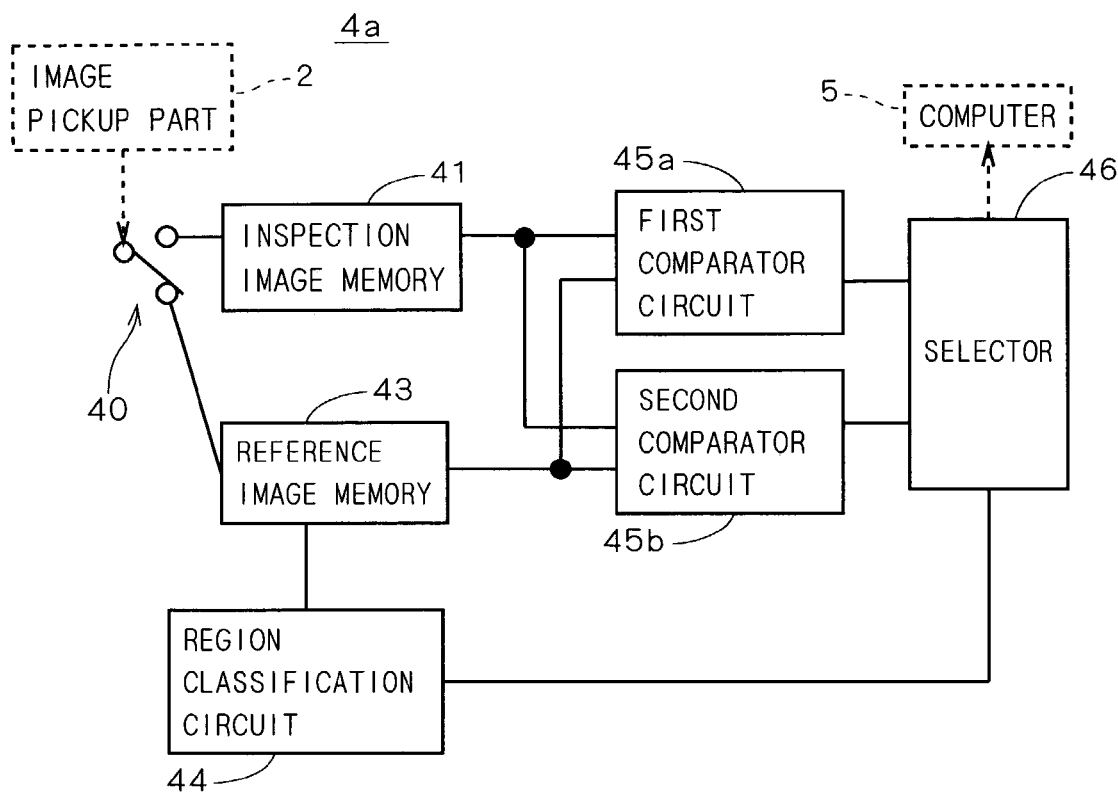
FIGS. 8 and 9 are block diagrams showing operation parts in accordance with second and third preferred embodiments, respectively.

FIG. 8 is a block diagram showing an operation part 4a in the inspection apparatus 1 in accordance with the second preferred embodiment. In the operation part 4a, the signal of the object image outputted from the image pickup part 2 is transmitted to the inspection image memory 41 or the reference image memory 43 through a switch 40. Other

TABLE 1

| Inspection Image Pixel No. (Pixel Value) | 611a (25) | 611b (200) | 612a (10) | 612b (230) | 613a (15) | 613b (235) | 614a (20) | 614b (210) |
|---|---|---|---|---|---|---|---|---|
| Reference Image Pixel No. | 612a | 612b | 613a | 613b | 614a | 614b | 613a | 613b |
| Differential Absolute Value | 15 | 30 | 5 | 5 | 5 | 25 | 5 | 25 |
| Comparator Circuit (Threshold Value) | 1 (10) | 2 (27) | 1 (10) | 2 (27) | 1 (10) | 2 (27) | 1 (10) | 2 (27) |
| Inspection Result | Defective | Defective | Non-Defective | Non-Defective | Non-Defective | Non-Defective | Non-Defective | Non-Defective |

In the result of Table 1, the differential absolute values of the pixels 611a and 611b are larger than the defect check threshold values of the dark region 63 and the bright region 64 to which these pixels belong, respectively, and these pixels are decided to be defective. Thus, while the conventional method has a problem that when the inspection image has the dark region 63 and the bright region 64, defect detection of the dark region 63 is difficult (if the threshold value is determined in accordance with the dark region 63, a number of pseudo defects are detected), the inspection apparatus 1 can appropriately detect both a defective pixel which belongs to the dark region 63 and a defective pixel which belongs to the bright region 64.

As described above, the inspection apparatus 1 acquires a plurality of inspection images and a plurality of reference images from the object image and specifies the region class to which each pixel in the inspection image belongs on the basis of the pixel values of the reference image. Then, the inspection apparatus 1 calculates a pixel feature value (in the above discussion, the differential absolute value is obtained as an example but any other feature value may be obtained) with reference to the reference image on each pixel in the inspection image and performs defect check on each pixel in the inspection image by using the defect check threshold value in accordance with the region class. As a result, even if there are a plurality of region classes in the inspection image 610, it is possible to perform an appropriate defect inspection for each region class and appropriately prevent detection of a number of pseudo defects and undetection of real defects.

constituent elements are the same as those described in the first preferred embodiment and are represented by the same reference signs.

An inspection image in the inspection apparatus 1 having the operation part 4a is, for example, an image of a pattern formed on each of logic regions of dies arranged on the substrate 9. When an inspection image is acquired in the inspection apparatus 1, the switch 40 gets connected to a side of the inspection image memory 41 and the stage driving part 31 transfers the stage 3 to move the image pickup position of the image pickup part 2 onto a logic region of a die on the substrate 9 (see FIG. 3). Then, data of an object image is stored in the inspection image memory 41 and a region of inspection image in the object image is specified.

When a reference image is acquired, the switch 40 gets connected to a side of the reference image memory 43 and the image pickup position of the image pickup part 2 is moved by the stage driving part 31 to the same position of another die (i.e., an image pickup region away from the previous image pickup region by an integral multiple of the cycle of patterns of the dies) to acquire an image on a logic region of another die. Then, data of the object image acquired by the image pickup part 2 is stored in the reference image memory 43 under the condition that the region of reference image can be specified. Though one object image can not include the inspection image and the reference image since the pattern in the logic region have no periodicity, the reference image can be prepared by performing an image pickup of a region away from the region on the substrate 9 by an integral multiple of the cycle of patterns of the dies.

When the inspection image and the reference image are acquired, like in the first preferred embodiment, the region classification threshold value is determined on the basis of the reference image, the comparator circuits 45a and 45b each perform a comparison check while the region classification circuit 44 sequentially specifies the region class for each pixel in the inspection image, and the selector 46 selects one of the defect check results in accordance with the specified region class.

Thus, in the inspection apparatus 1 of the second preferred embodiment, the inspection image and the reference image which are present in different regions on the substrate 9 away from each other are acquired by controlling the stage driving part 31, to thereby achieve an appropriate detection of defect on each pixel in an inspection image for each region class.

Figure 9:
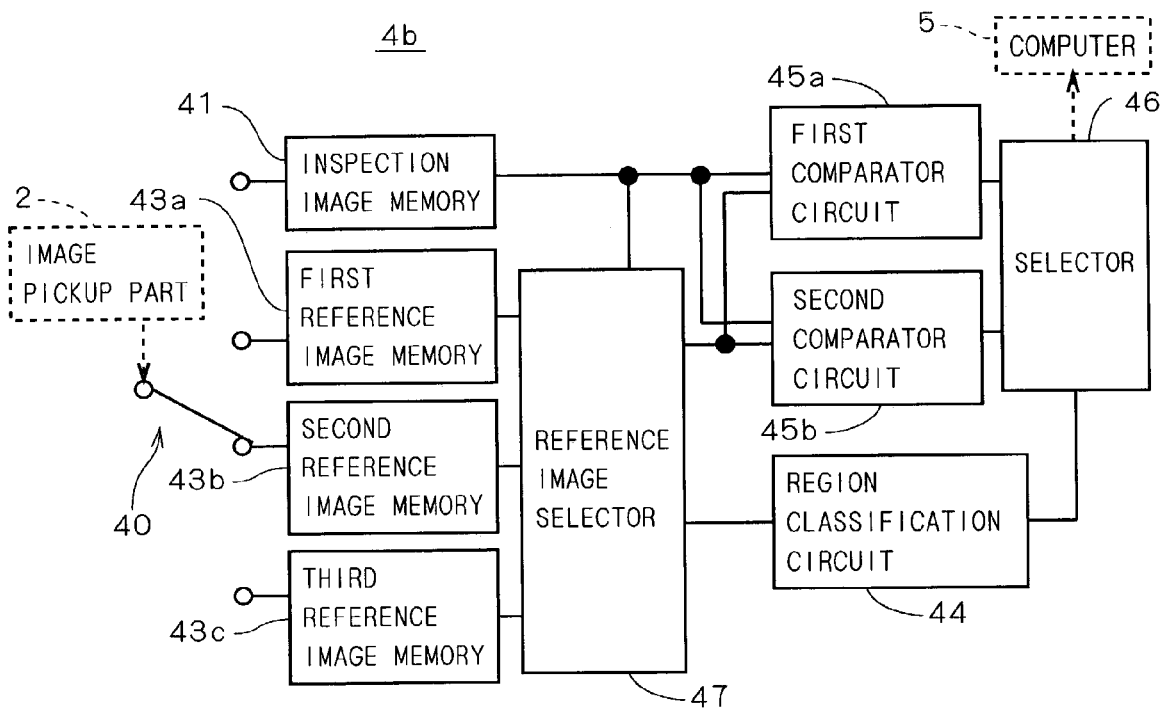

FIG. 9 is a block diagram showing an operation part 4b in the inspection apparatus 1 in accordance with the third preferred embodiment. The operation part 4b has a switch 40 and controls the stage driving part 31 and the switch 40 to input the object image acquired by the image pickup part 2 to the inspection image memory 41, a first reference image memory 43a, a second reference image memory 43b or a third reference image memory 43c. Like in the second preferred embodiment, the object image is stored in the inspection image memory 41 under the condition that the region of inspection image can be specified and a plurality of object images indicating regions away from the region of inspection image by integral multiples of the cycle of patterns of the dies on the substrate 9 are stored in the reference image memories 43a to 43c under the condition that the respective regions of reference image can be specified. Then, an average of pixel values of a plurality of reference images is set in the region classification circuit 44 as the region classification threshold value.

Figure 10:
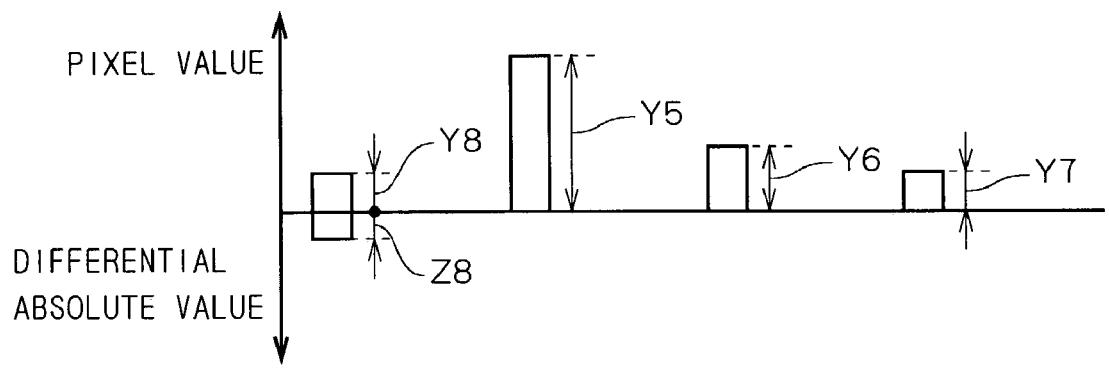
FIG. 10 is a view used for explaining selection of a pixel value by a reference image selector.

When the pixel value is sequentially inputted from the inspection image memory 41 to the first and second comparator circuits 45a and 45b, the corresponding pixel values of the reference images are inputted from the reference image memories 43a to 43c to a reference image selector 47. The reference image selector 47 selects an intermediate value among a plurality of inputted pixel values and outputs the selected value. For example, assuming that the three inputted pixel values are Y5, Y6 and Y7 (Y5>Y6>Y7), as shown in FIG. 10, the reference image selector 47 selects the pixel value Y6 which is an intermediate value among the pixel values Y5 to Y7 and outputs the pixel value Y6 to the region classification circuit 44 and the comparator circuits 45a and 45b.

Both the comparator circuits 45a and 45b each calculate the differential absolute value between the pixel value of the inspection image and the pixel value of the selected reference image. Assuming that the pixel value of the inspection image is Y8, as shown in FIG. 10, the comparator circuits 45a and 45b each calculate a differential absolute value Z8 between the pixel value Y8 and the pixel value Y6, and defect check is performed on the basis of the defect check threshold value which is determined in advance. On the other hand, the pixel value of the selected reference image is also inputted to the region classification circuit 44, and the selector 46 selects one of the defect check results on the basis of the region class specified by the region classification circuit 44 and the selected defect check result is outputted to the computer 5, like in the first preferred embodiment.

Thus, in the inspection apparatus 1 of the third preferred embodiment, a plurality of reference images are acquired for one inspection image, and selection of the reference image is performed for each pixel. In other words, a new reference image is substantially generated from a plurality of reference images and the region classification (specification of region class) and the defect check are performed on the basis of the generated reference image. Even if the pixel value taken out from one reference image is a value of defective pixel, an appropriate defect inspection can be thereby performed only if values of non-defective pixels are taken out from other two reference images, and it is therefore possible to improve the precision in defect inspection.

The pixel value which is determined from a plurality of reference images is not necessarily limited to an intermediate value, but there may be a case where an average of pixel values of a plurality of reference images, for example, is calculated and the average value is used for the region classification and the defect check.

There may be another case where the image pickup part 2 is connected to the inspection image memory 41, instead of providing the switch 40, like in the first preferred embodiment, and part of the object image is used as an inspection image, a plurality of regions positioned from the inspection image by integral multiples of the cycle of patterns are used as reference images, and data of these images are stored in the first to third reference image memories 43a to 43c.

Figure 11:
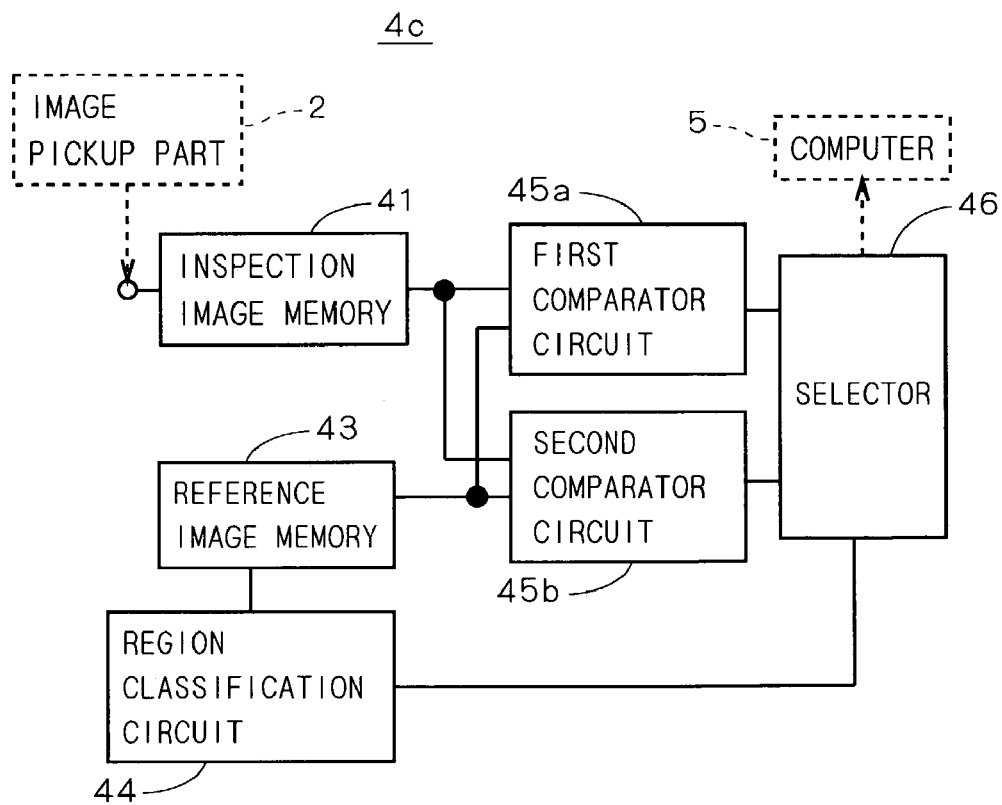
FIGS. 11 to 13 are block diagrams showing operation parts in accordance with fourth to sixth preferred embodiments, respectively.

FIG. 11 is a block diagram showing an operation part 4c in the inspection apparatus 1 in accordance with the fourth preferred embodiment. In the reference image memory 43 of the operation part 4c, data of a golden template image (in other words, an image with no defect or an image presumably with no defect) which is generated from CAD data is stored in advance. Other constituent elements are the same as those described in the first preferred embodiment and are represented by the same reference signs.

When inspection is performed by the inspection apparatus 1 having the operation part 4c, even if most of regions to be inspected on the substrate 9 are defective, it is possible to prevent the pixel of the reference image corresponding to each pixel of the inspection image from being a defective pixel and appropriately perform defect inspection of the inspection image. As the golden template image, an image acquired by performing an image pickup of the region to be inspected, which has no defect, on the substrate 9, an image acquired by performing an image processing on this image, such as smoothing or noise addition through contrast control, or the like may be adopted.

Figure 12:
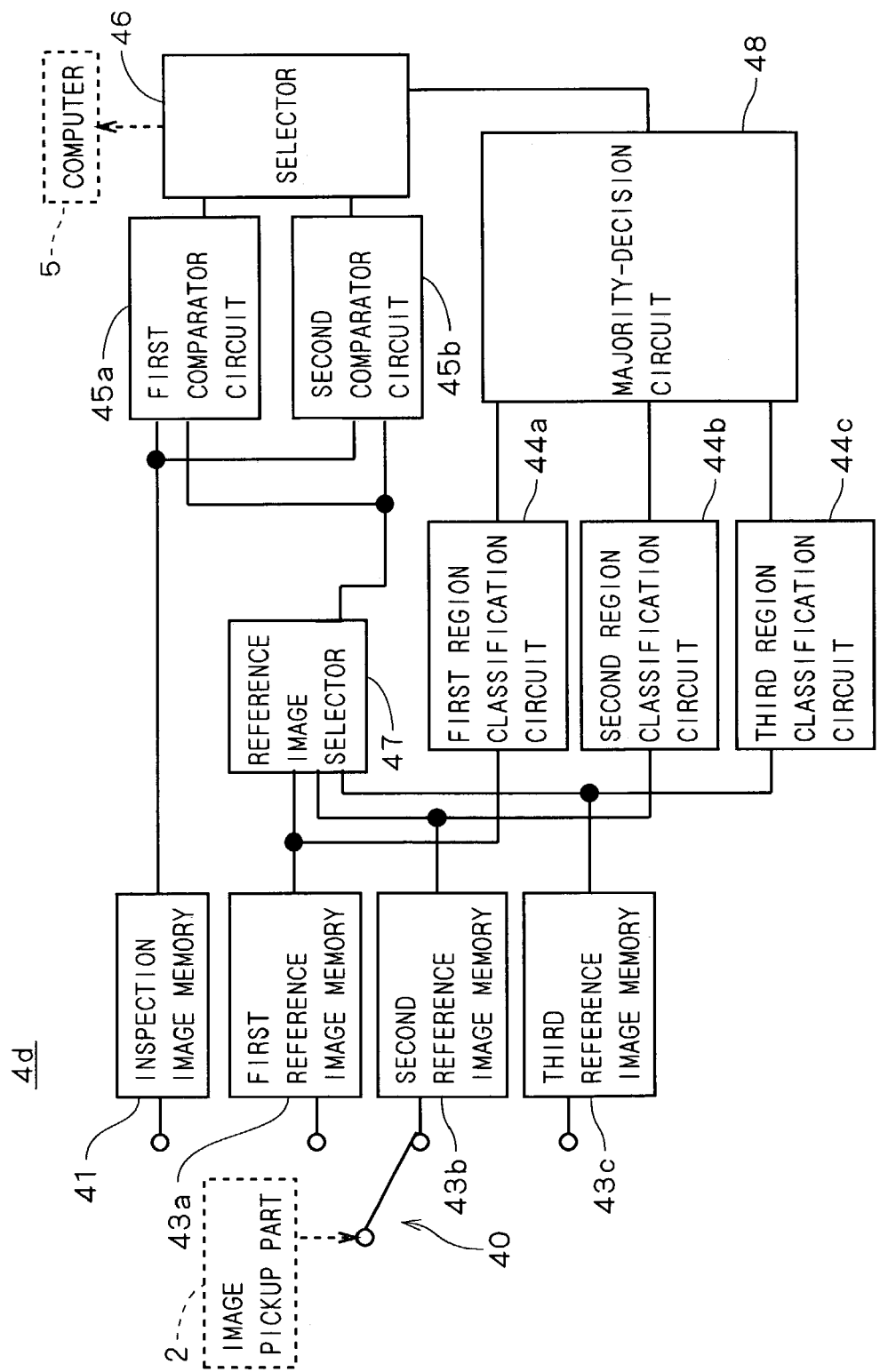

FIG. 12 is a block diagram showing an operation part 4d in the inspection apparatus 1 in accordance with the fifth preferred embodiment. The operation part 4d is different from the operation part 4b of the third preferred embodiment in that first to third region classification circuits 44a to 44c to which the pixel values from the first to third reference image memories 43a to 43c are directly inputted are additionally provided and outputs from the region classification circuits 44a to 44c are inputted to the selector 46 through a majority-decision circuit 48.

Respective average values of the pixel values of the reference images in the first to third reference image memories 43a to 43c are determined in the first to third region classification circuits 44a to 44c as region classification threshold values, and the region classes on the pixel values from the first to third reference image memories 43a to 43c are specified, respectively. From the specified region classes (region classification results), the majority-decision circuit 48 determines one region classification result based on majority rule, and the region classification result is used for control of the selector 46.

Even if there is some problem in the pixel values of the reference images, the region class can be thereby specified with precision and it is therefore possible to improve the precision of defect inspection.

Figure 13:
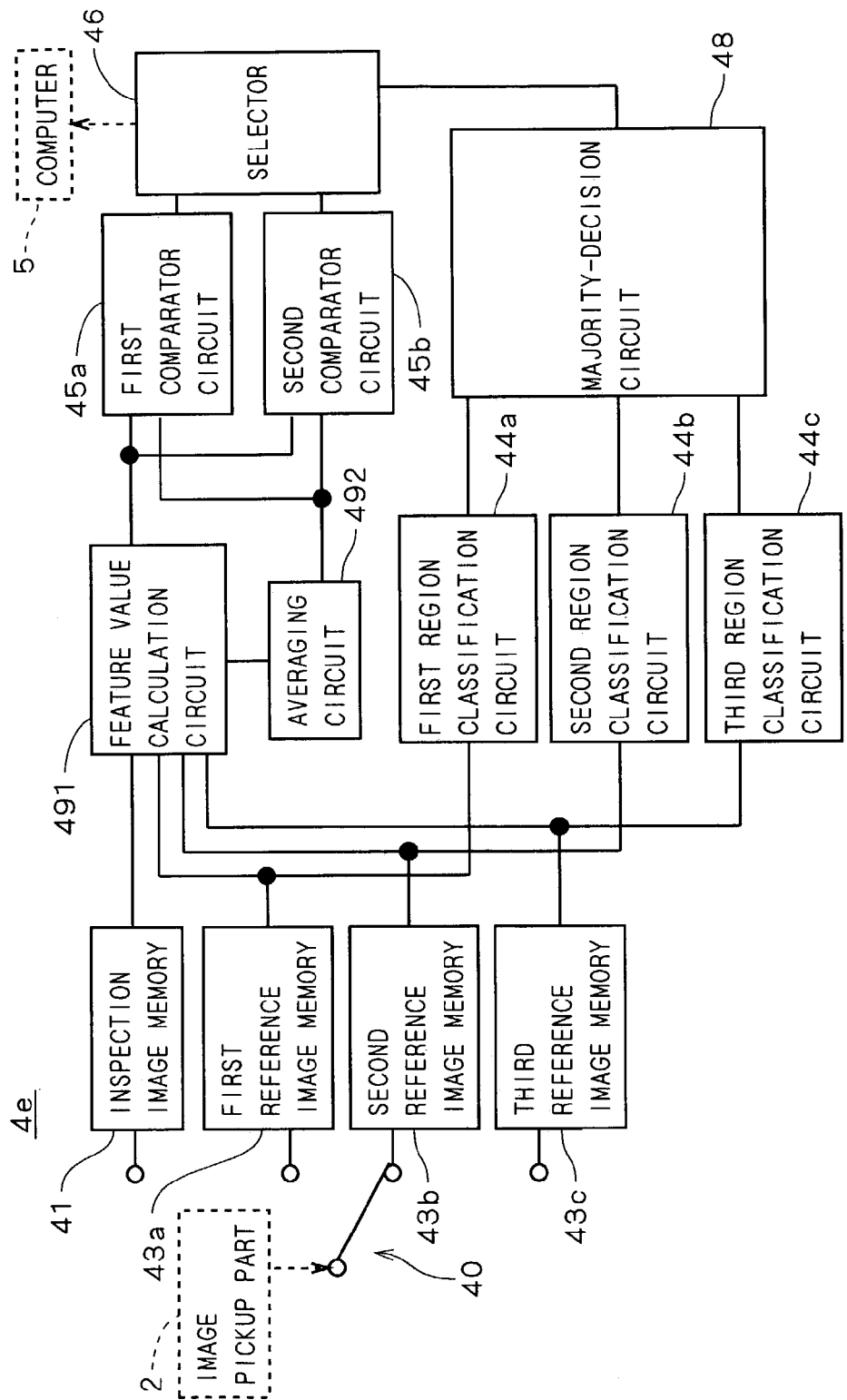

FIG. 13 is a block diagram showing an operation part 4e in the inspection apparatus 1 in accordance with the sixth preferred embodiment. In the operation part 4e, the first to third reference image memories 43a to 43c, the first to third region classification circuits 44a to 44c and the majority-decision circuit 48 are provided, like in the fifth preferred embodiment, and a classification result on region class is obtained on majority rule, on the basis of a plurality of reference images.

On the other hand, the operation part 4e is further provided with a feature value calculation circuit 491 between the inspection image memory 41 and the first and second comparator circuits 45a and 45b, and the pixel value of the inspection image and the pixel values of a plurality of reference images are inputted from the inspection image memory 41 and the first to third reference image memories 43a to 43c to the feature value calculation circuit 491.

In the feature characteristics value calculation circuit 491, standard deviations (totally, three standard deviations) of a plurality of pixel values (or all the pixel values) in differential images which indicate the differential absolute values between the inspection image and the reference images are prepared in advance. When the pixel values of the inspection image and the three reference images are inputted, the three differential absolute values on the pixel value of the inspection image are calculated and these differential absolute values are normalized by the corresponding standard deviations. Specifically, the differential absolute values are divided by the corresponding standard deviations and multiplied by a predetermined coefficient. Since the normalized differential absolute values may be used as values of probability of defect, hereinafter, the normalized differential absolute values are referred to as "error probability values".

When the three error probability values are obtained, the feature value calculation circuit 491 further multiplies the three error probability values (or obtains a geometric mean) and outputs the result to the first and second comparator circuits 45a and 45b as pixel feature values. The computation in the feature value calculation circuit 491 is substantially equivalent to an operation in which the differential images between the inspection image and the reference images are obtained, the pixel values of the differential images are normalized and a new differential image having the geometric mean of values of corresponding pixels of a plurality of normalized differential images as pixel values is generated. The feature value calculation circuit 491 may be additionally provided with an image memory for storing the newly-generated differential image. The new differential image may be generated as an average-value image of a plurality of normalized differential images.

In the first and second comparator circuits 45a and 45b, respective defect check threshold values in accordance with the region classes for the pixel feature value are determined in advance and the defect check is performed on the basis of the inputted pixel feature value. The results of defect checks performed by the comparator circuits 45a and 45b are inputted to the selector 46, and the selector 46 selects one of the defect check results in accordance with the region class determined by the majority-decision circuit 48 and transmits the selected defect check result to the computer 5, like in the fifth preferred embodiment.

Thus, in the inspection apparatus 1 of the sixth preferred embodiment, by performing the defect check on the basis of the differential images normalized by the standard deviations, it is possible to perform an appropriate defect inspection even if there is variation in quality of images from the image pickup part 2.

Next, another exemplary processing for defect check by the inspection apparatus 1 having the operation part 4e will be discussed. The operation part 4e is further provided with an averaging circuit 492 for performing an additional defect check, which obtains an average value of pixel feature value generated by the feature value calculation circuit 491 and pixel feature values of peripheral pixels (which are separately stored immediately before this processing) and outputs the average value to the first and second comparator circuits 45a and 45b. Defect check threshold values in accordance with the output from the averaging circuit 492 are determined in the comparator circuits 45a and 45b in advance, and the comparator circuits 45a and 45b each perform defect check and the selector 46 selects one of the defect check results and outputs the selected defect check result, like in the above operation.

Thus, since the operation part 4e performs the defect check by substantially smoothing the differential image which is normalized by the standard deviation, it is possible to detect even a defect which extends across a plurality of pixels, like a stain, (in other words, a defect having a pixel value slightly larger than that of "non-defective" pixel and a relatively large area).

In the feature value calculation circuit 491, it is not necessary to normalize a differential images by a standard deviation but the differential image may be normalized by using a cumulative value of frequencies within a given range in the histogram of the differential absolute values. In other words, the differential image may be normalized on the basis of various differential statistics feature values obtained from statistics on the pixel values of the differential image.

In the inspection apparatus 1 of the first to sixth preferred embodiments discussed above, the functions of the operation parts 4 and 4a to 4e of the inspection apparatus 1 may be performed by the computer 5. A case where the computer 5 performs the operation as the operation parts 4 and 4a to 4e will be discussed below.

Figure 14:
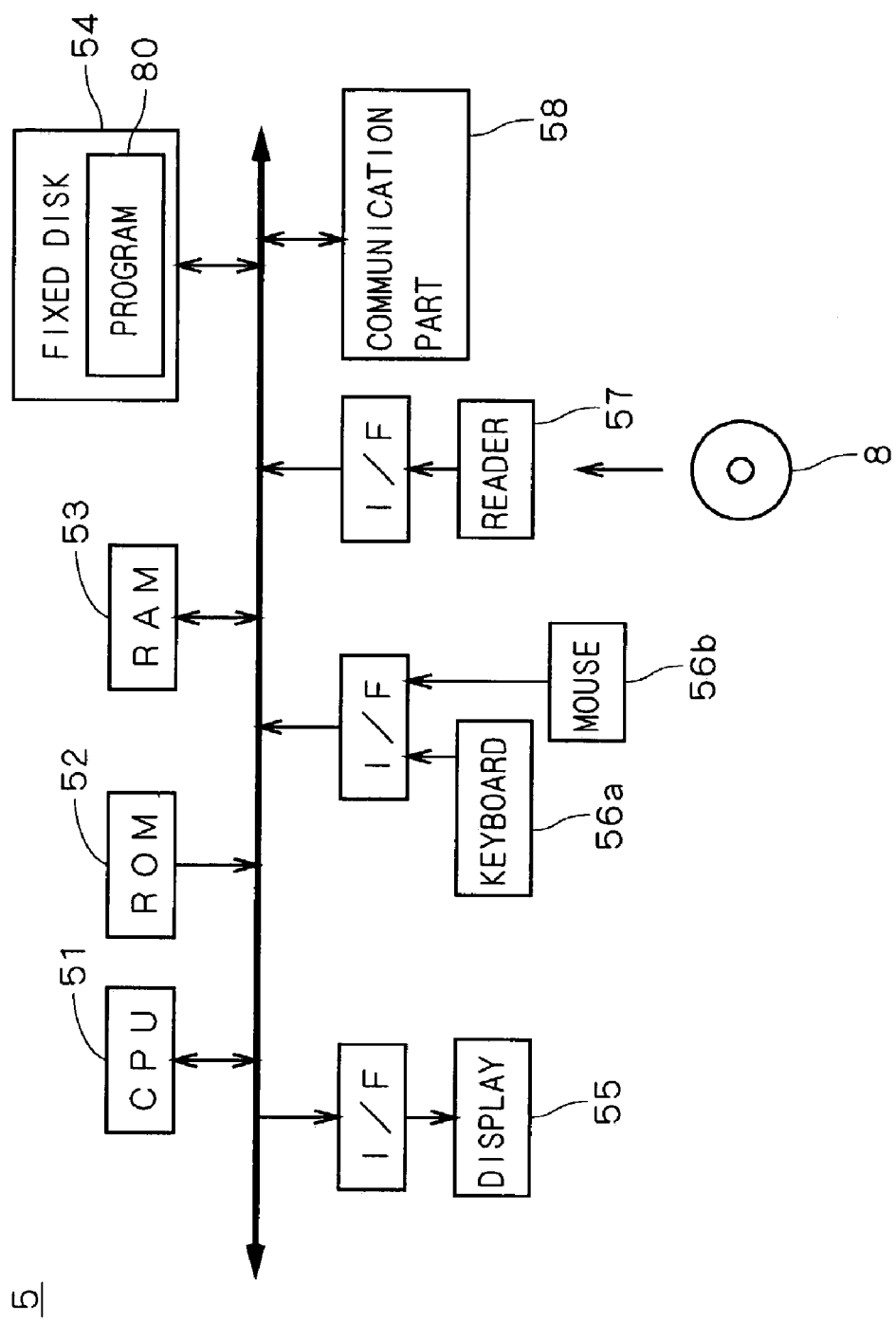
FIG. 14 is a view showing a constitution of a computer.

The computer 5 has a constitution of general computer system, as shown in FIG. 14, where a CPU 51 for performing various computations, a ROM 52 for storing a basic program and a RAM 53 for storing various information are connected to a bus line. To the bus line, a fixed disk 54 for storing information, a display 55 for displaying various information such as images, a keyboard 56a and a mouse 56b for receiving an input from an operator, a reader 57 for reading information from a computer-readable recording medium 8 such as an optical disk, a magnetic disk or a magneto-optic disk, and a communication part 58 for transmitting and receiving a signal to/from other constituent elements in the inspection apparatus 1 are further connected through an interface (I/F) as appropriate.

A program 80 is read out from the recording medium 8 through the reader 57 into the computer 5 and stored into the fixed disk 54 in advance. The program 80 is copied to the RAM 53 and the CPU 51 executes computation in accordance with the program stored in the RAM 53 (in other words, the computer 5 executes the program), and the computer 5 thereby performs operations as the operation parts 4 and 4a to 4e.

Figure 15:
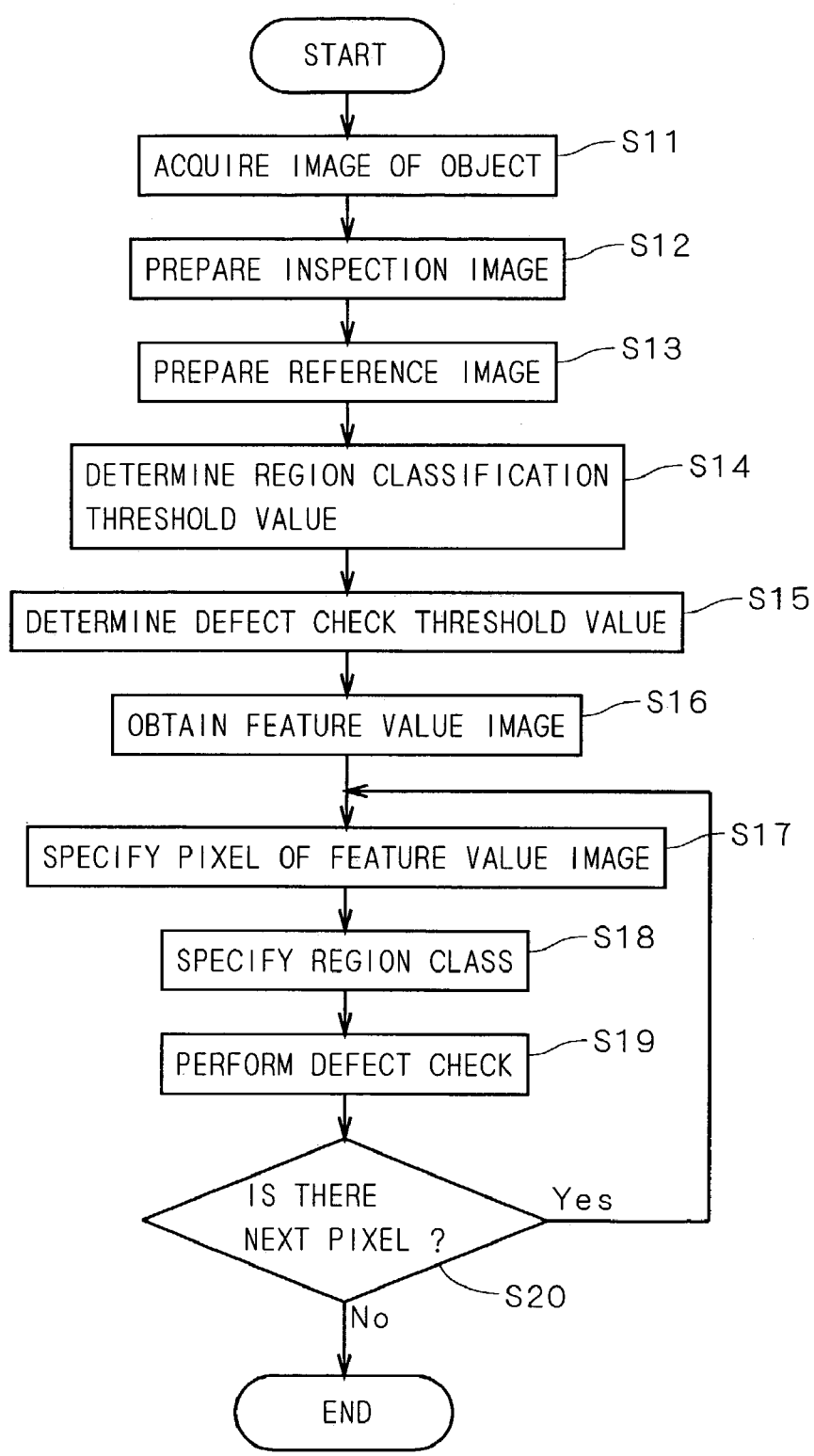
FIG. 15 is a flowchart showing an operation flow of defect check.

FIG. 15 is a flowchart showing an operation flow of defect check by the computer 5. In the computer 5, first, in response to the signal from the image pickup part 2, data of an object image is stored into the fixed disk 54 (or may be stored in advance) and an inspection image in the object image is specified by the CPU 51, being prepared accessible (Steps S11 and S12). Further, data of reference images as many as necessary are prepared in the fixed disk 54 (Step S13).

When the operation of the first preferred embodiment is performed, for example, part of the object image is specified as the inspection image and a region away from the inspection image by an integral multiple of the cycle of pattern is specified as the reference image. On the other hand, when the reference image(s) is directly acquired by the image pickup part 2, like in the other preferred embodiments, the computer 5 transfers the stage 3 by an integral multiple of the cycle of patterns of the dies as appropriate to perform image pickups of the inspection image and the reference images as many as necessary, or a golden template image is prepared as the reference image.

Next, a region classification threshold value is determined on the basis of the reference image (Step S14). When the same operations as those in the first, second and fourth preferred embodiments are performed, for example, an average of the pixel values of the reference image is obtained as the region classification threshold value. When the same operation as that in the third preferred embodiment is performed, a new reference image is generated from a plurality of reference images and then the region classification threshold value is determined. When the same operations as those in the fifth and sixth preferred embodiments are performed, the region classification threshold value is determined for each reference image.

When the region classification threshold value is obtained by the computer 5, as discussed above, the region classification threshold value can be also obtained easily on the basis of the histogram of pixel values of the reference image. Further, the region classification threshold value may be obtained with high precision in consideration of the position of the maximum value and the whole distribution in the histogram as well as the position of the minimum value and the intermediate value.

On the other hand, with inputs by the operator (i.e., a user), defect check threshold values in accordance with the region classes (and the type of pixel feature value used for the defect check) are determined (Step S15). Naturally, the defect check threshold values may be automatically determined on the basis of the optical setting of the image pickup part 2, data prepared in advance and the like.

When the threshold values are prepared, a feature value image having pixel feature values corresponding to pixels of the inspection image as pixel values are obtained by the CPU 51 on the basis of the inspection image and the reference image(s) (Step S16). When the same operations as those in the first to fifth preferred embodiments are performed, for example, a differential image between the inspection image and the reference image (or a new reference image generated from a plurality of reference images) is obtained as the feature value image, and when the same operation as that in the sixth preferred embodiment is performed, the feature value image having the geometric mean of error probability values of pixels corresponding to one another as pixel values or an image obtained by smoothing the feature value image is obtained.

Then, one pixel in the feature value image is specified (Step S17), and the region class to which the pixel belongs is specified by comparing a value of the corresponding pixel of the reference image (or the newly-generated reference image) with the region classification threshold value (in the fifth and sixth preferred embodiments, one of a plurality of specified region classes is determined on majority rule) (Step S18). The pixel value in the feature value image is compared with the defect check threshold value corresponding to the specified region classification threshold value and it is decided whether the corresponding pixel in the inspection image is defective one or not (Step S19).

By repeatedly performing Steps S17 to S19 for pixels in the feature value image, the defect check-is completed on all the pixels in the inspection image (Step S20). Through the above process steps, like in the first to sixth preferred embodiments, it is possible to appropriately prevent detection of a number of false defects and undetection of real defects. The defect check result is stored into the fixed disk 54 as e.g., binary image data indicating the position of the defect.

Though it has been discussed that the feature value image is generated in the computer 5, as discussed in the first to sixth preferred embodiments, one pixel feature value may be obtained every time when one pixel is checked. In the case of defect inspection by the computer 5, the operation process may be flexibly changed.

Though the preferred embodiments of the present invention have been discussed above, the present invention is not limited to the above-discussed preferred embodiments, but allows various variations.

Figure 16:
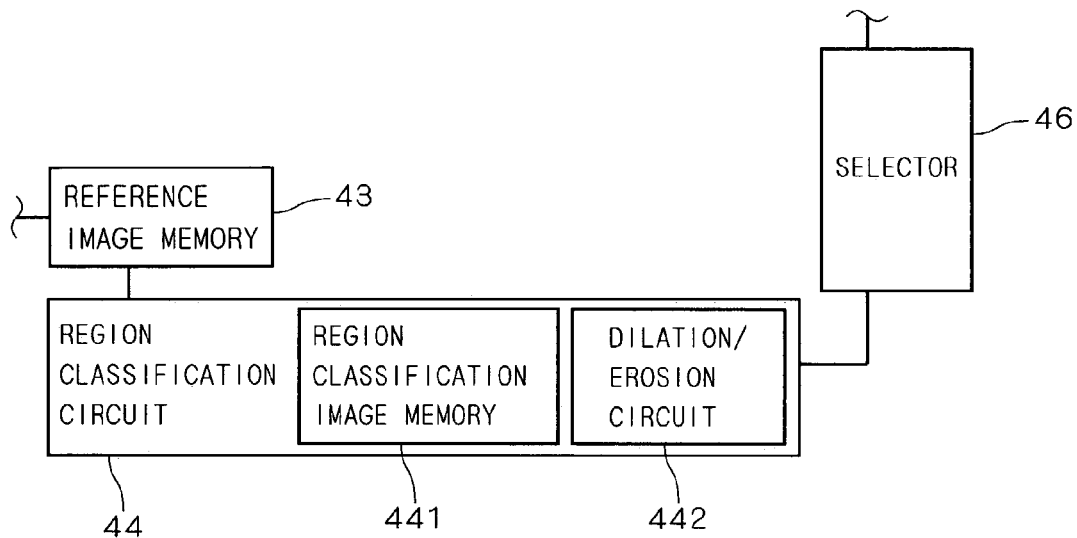
FIG. 16 is a block diagram showing another exemplary constitution of an operation part.
Figure 17:
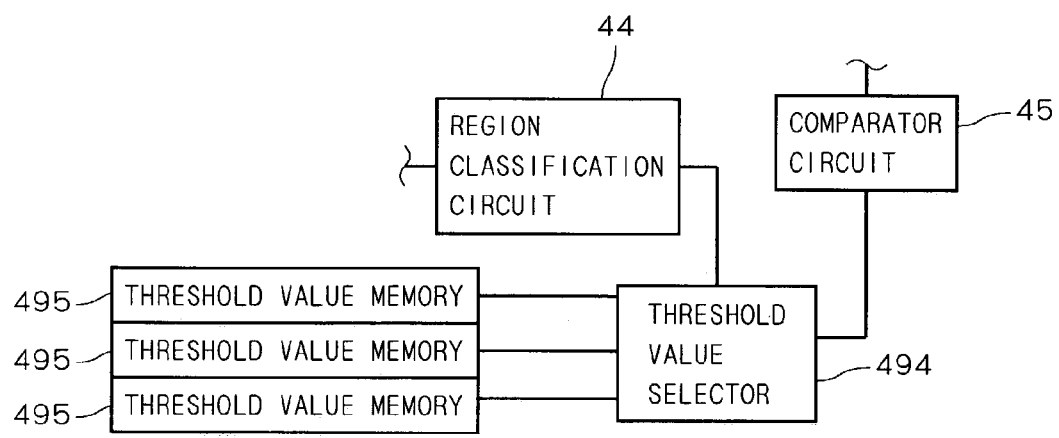
FIG. 17 is a block diagram showing still another exemplary constitution of an operation part.

While one of the region classes on the pixels of a plurality of reference images is specifically determined on majority rule by the majority-decision circuit 48 in the fifth and sixth preferred embodiments, the same function may be achieved by providing, e.g., only a set of the reference image memory 43 and the region classification circuit 44 and further providing a region classification image memory 441 and an dilation/erosion circuit 442 in the region classification circuit 44, as shown in FIG. 16. In the region classification circuit 44 of FIG. 16, when the region classification threshold value is determined, a binary image indicating the region class of each pixel is stored in the region classification image memory 441 as the region classification image. The dilation/erosion circuit 442 performs dilating or eroding operation on the region classification image to remove noise and the selector 46 is controlled on the basis of the region classification image after noise removal, to thereby suppress a wrong classification on region class.

While a plurality of comparator circuits are provided and one of the defect check results obtained by the comparator circuits is selected by the selector 46 in accordance with the region classification result in the first to sixth preferred embodiments, there may be a case, for example, where the region classification result obtained by the region classification circuit 44 is inputted to a threshold value selector 494 and the threshold value selector 494 selects one of the threshold values from threshold value memories 495 in accordance with the region class and outputs the selected threshold value to the comparator circuit 45 as the defect check threshold value. This allows an appropriate defect check in accordance with region class by providing only one comparator circuit 45.

While the defect check is performed by each comparator circuit with one defect check threshold value in the first to sixth preferred embodiments, in a case of inspection on a color image or complicate defect check, a plurality of defect check threshold values may be used compositely as parameter values used for check.

While the defect check threshold value is determined, corresponding to the pixel values of one of the differential image between the inspection image and the reference image, the normalized image obtained by normalizing the pixel values of the differential image with the differential statistics feature value and the image obtained by smoothing the normalized image in the above-discussed preferred embodiments, defect check threshold values on a plurality of types of images among the above images may be determined to perform defect check with high precision.

In the comparator circuit, the defect checks on a plurality of pixels in the inspection image may be performed at the same time, or the defect check may be performed with the lowered resolution by regarding a plurality of pixels as one pixel.

The image pickup part 2 and the stage 3 have only to be transferred relatively to each other, and there may be a case, for example, where the stage 3 is fixed and a transfer mechanism for the image pickup part 2 is provided.

While the invention has been shown and described in detail, the foregoing description is in all aspects illustrative and not restrictive. It is therefore understood that numerous modifications and variations can be devised without departing from the scope of the invention.

What is claimed is:

1. An apparatus for inspecting a pattern on an object, comprising:
    an image pickup device for performing an image pickup of an object to acquire data of a gray-scale inspection image;
    a memory for storing data of a reference image;
    a region class specifying circuit for specifying a region class to which each pixel of said inspection image belongs on the basis of a pixel value of said reference image; and
    a check circuit for checking each pixel of said inspection image by using a parameter value in accordance with a corresponding region class, wherein
    the pattern on said object has periodicity and said inspection image is part of an object image acquired by said image pickup device,
    said memory stores a region away from said inspection image by an integral multiple of a cycle of said pattern as said reference image,
    said region class specifying circuit generates a histogram of pixel values of said reference image and specifies said region class on the basis of said histogram, and
    said parameter value is a value corresponding to at least one of a differential image between said inspection image and said reference image, a normalized image which is obtained by normalizing pixel values of said differential image with a differential statistics feature value, and an image which is obtained by smoothing said normalized image.

2. The apparatus according to claim 1, wherein
said memory stores a plurality of images, and
said apparatus further comprising
a circuit for generating said reference image from said plurality of images.

3. An apparatus for inspecting a pattern on an object, comprising:
    an image pickup device for performing an image pickup of an object to acquire data of a gray-scale inspection image;
    a mechanism for transferring said object relatively to said image pickup device;
    a memory for storing data of a reference image;
    a region class specifying circuit for specifying a region class to which each pixel of said inspection image belongs on the basis of a pixel value of said reference image; and
    a check circuit for checking each pixel of said inspection image by using a parameter value in accordance with a corresponding region class,
    wherein the pattern on said object has periodicity, and said inspection image and said reference image are images of regions which are away from each other by an integral multiple of a cycle of said pattern,
    said region class specifying circuit generates a histogram of pixel values of said reference image and specifies said region class on the basis of said histogram, and
    said parameter value is a value corresponding to at least one of a differential image between said inspection image and said reference image, a normalized image which is obtained by normalizing pixel values of said differential image with a differential statistics feature value, and an image which is obtained by smoothing said normalized image.

4. The apparatus according to claim 3, wherein
said memory stores a plurality of images, and
said apparatus further comprising
a circuit for generating said reference image from said plurality of images.

5. An apparatus for inspecting a pattern on an object, comprising:
    an image pickup device for performing an image pickup of an object to acquire data of gray-scale inspection image;
    a memory for storing data of a reference image;
    a region class specifying circuit for specifying a region class to which each pixel of said inspection image belongs on the basis of a pixel value of said reference image; and
    a check circuit for checking each pixel of said inspection image by using a parameter value in accordance with a corresponding region class, wherein
    said memory stores a golden template image as said reference image,
    said region class specifying circuit generates a histogram of pixel values of said reference image and specifies said region class on the basis of said histogram, and
    said parameter value is a value corresponding to at least one of a differential image between said inspection image and said reference image, a normalized image which is obtained by normalizing pixel values of said differential image with a differential statistics feature value, and an image which is obtained by smoothing said normalized image.

6. A method of inspecting a pattern on an object, comprising:
    a region class specifying step of specifying a region class to which each pixel of a gray-scale inspection image acquired from an object belongs on the basis of a pixel value of a reference image; and
    a checking step of checking each pixel of said inspection image by using a parameter value in accordance with a corresponding region class, wherein
    the pattern on said object has periodicity,
    a part of an object image acquired from said object is specified as said inspection image, a region away from said inspection image by an integral multiple of a cycle of said pattern is specified as said reference image, said region class is specified on the basis of a histogram of pixel values of said reference image in said region class specifying step, and said parameter value is a value corresponding to at least one of a differential image between said inspection image and said reference image, a normalized image which is obtained by normalizing pixel values of said differential image with a differential statistics feature value, and an image which is obtained by smoothing said normalized image.

7. The method according to claim 6, wherein a plurality of reference images are prepared before said region class specifying step and a new reference image is generated from said plurality of reference images.

8. A method of inspecting a pattern on an object, comprising:

a region class specifying step of specifying a region class to which each pixel of a gray-scale inspection image acquired from an object belongs on the basis of a pixel value of a reference image; and a checking step of checking each pixel of said inspection image by using a parameter value in accordance with a corresponding region class, wherein the pattern on said object has periodicity, an image of a region away from a region on said object corresponding to said inspection image by an integral multiple of a cycle of said pattern is prepared as said reference images, said region class is specified on the basis of a histogram of pixel values of said reference image in said region class specifying step, and said parameter value is a value corresponding to at least one of a differential image between said inspection image and said reference image, a normalized image which is obtained by normalizing pixel values of said differential image with a differential statistics feature value, and an image which is obtained by smoothing said normalized image.

9. The method according to claim 8, wherein a plurality of reference images are prepared before said region class specifying step and a new reference image is generated from said plurality of reference images.

10. A method of inspecting a pattern on an object, comprising:

a region class specifying step of specifying a region class to which each pixel of a gray-scale inspection image acquired from an object belongs on the basis of a pixel value of a reference image; and a checking step of checking each pixel of said inspection image by using a parameter value in accordance with a corresponding region class, wherein a golden template image is prepared as said reference image, said region class is specified on the basis of a histogram of pixel values of said reference image in said region class specifying step, and said parameter value is a value corresponding to at least one of a differential image between said inspection image and said reference image, a normalized image which is obtained by normalizing pixel values of said differential image with a differential image with a differential statistics feature value, and an image which is obtained by smoothing said normalized image.

11. A computer-readable recording medium carrying a program for executing an inspection of a pattern on an object on the basis of data of a multitone inspection image acquired from said object, wherein execution of said program by a computer causes said computer to perform:

a region class specifying step of specifying a region class to which each pixel of said inspection image belongs on the basis of a pixel value of a reference image; and a checking step of checking each pixel of said inspection image by using a parameter value in accordance with a corresponding region class, wherein the pattern on said object has periodicity, a part of an object image acquired from said object is specified as said inspection image; and a region away from said inspection image by an integral multiple of a cycle of said pattern is specified as said reference image, said region class is specified on the basis of a histogram of pixel values of said reference image in said region class specifying step, and said parameter value is a value corresponding to at least one of a differential image between said inspection image and said reference image, a normalized image which is obtained by normalizing pixel values of said differential image with a differential statistics feature value, and an image which is obtained by smoothing said normalized image.

12. The computer-readable recording medium according to claim 11, wherein a plurality of reference images are prepared before said region class specifying step, and execution of said program by said computer causes said computer to further perform the step of generating a new reference image from said plurality of reference images.

13. A computer-readable recording medium carrying a program for executing an inspection of a pattern on an object on the basis of data of a multitone inspection image acquired from said object, wherein execution of said program by a computer causes said computer to perform:

a region class specifying step of specifying a region class to which each pixel of said inspection image belongs on the basis of a pixel value of a reference image; and a checking step of checking each pixel of said inspection image by using a parameter value in accordance with a corresponding region class, wherein the pattern on said object has periodicity, an image of a region away from a region on said object corresponding to said inspection image by an integral multiple of a cycle of said patterns is prepared as said reference image, said region class is specified on the basis of a histogram of pixel values of said reference image in said region class specifying step, and said parameter value is a value corresponding to at least one of a differential image between said inspection image and said reference image, a normalized image which is obtained by normalizing pixel values of said differential image with a differential statistics feature value, and an image which is obtained by smoothing said normalized image.

14. The computer-readable recording medium according to claim 13, wherein a plurality of reference images are prepared before said region class specifying step, execution of said program by said computer causes said computer to further perform the step of generating a new reference image from said plurality of reference images.

15. A computer-readable recording medium carrying a program for executing an inspection of a pattern on an object on the basis of data of a multitone inspection image acquired from said object, wherein execution of said program by a computer causes said computer to perform:
- a region class specifying step of specifying a region class to which each pixel of said inspection image belongs on the basis of a pixel value of a reference image; and
- a checking step of checking each pixel of said inspection image by using a parameter value in accordance with a corresponding region class, wherein
- a golden template image is prepared as said reference image,
- said region class is specified on the basis of a histogram of pixel values of said reference image in said region class specifying step, and
- said parameter value is a value corresponding to at least one of a differential image between said inspection image and said reference image, a normalized image which is obtained by normalizing pixel values of said differential image with a differential statistics feature value, and an image which is obtained by smoothing said normalized image.

* * * * *